(12) United States Patent
Meyer et al.

(10) Patent No.: US 6,564,146 B1
(45) Date of Patent: May 13, 2003

(54) TRACKING SYSTEM FOR PROVIDING POSITION INFORMATION

(75) Inventors: Steven J. Meyer, Ridgecrest, CA (US); John H. Merts, Niceville, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 86 days.

(21) Appl. No.: 09/954,305

(22) Filed: Sep. 6, 2001

Related U.S. Application Data

(63) Continuation-in-part of application No. 09/488,594, filed on Jan. 24, 2000, now abandoned.

(51) Int. Cl.$^7$ .......................... G01C 21/00; G06G 7/78; B64C 1/00; G06F 19/00; F41G 7/00
(52) U.S. Cl. .............................. 701/213; 701/4; 701/7; 701/14; 701/215; 701/225; 701/302; 244/3.19; 244/3.14; 342/119; 342/62
(58) Field of Search .................. 701/4, 7, 14, 213, 701/215, 225, 300, 302; 244/3.19, 3.14; 342/119, 62

(56) References Cited

U.S. PATENT DOCUMENTS

| | | | | |
|---|---|---|---|---|
| 5,450,329 A | * | 9/1995 | Tanner | 701/213 |
| 5,587,904 A | * | 12/1996 | Ben-Yair et al. | 701/213 |
| 5,644,318 A | * | 7/1997 | Janky et al. | 342/357.08 |
| 5,689,420 A | * | 11/1997 | Brewster | 701/14 |
| 5,760,743 A | * | 6/1998 | Law et al. | 342/458 |
| 5,991,691 A | * | 11/1999 | Johnson | 701/214 |
| 6,037,899 A | * | 3/2000 | Weber | 342/357.06 |
| 6,044,323 A | * | 3/2000 | Yee et al. | 701/120 |
| 6,069,584 A | * | 5/2000 | Johnson | 342/357.09 |
| 6,072,433 A | * | 6/2000 | Young et al. | 342/386 |
| 6,133,867 A | * | 10/2000 | Eberwine et al. | 342/29 |
| 6,140,958 A | * | 10/2000 | Johnson et al. | 342/357.09 |
| 6,157,891 A | * | 12/2000 | Lin | 701/301 |
| 6,181,274 B1 | * | 1/2001 | Pratt et al. | 342/357.04 |
| 6,182,011 B1 | * | 1/2001 | Ward | 701/213 |
| 6,195,038 B1 | * | 2/2001 | Oster et al. | 342/357.03 |

OTHER PUBLICATIONS

"Sidewinder Missile GPS Receiver Tests", Steven J. Meyer and John H. Merts, Jun. 1999, pp. 1–6.

* cited by examiner

Primary Examiner—Jacques H. Louis-Jacques
Assistant Examiner—Brian J Broadhead
(74) Attorney, Agent, or Firm—David Kalmbaugh

(57) ABSTRACT

Processing GPS signals received at moving targets and at a fixed location near instrumentation associated with timing and recording an event allows the determination of instantaneous target position to be made without a requirement for additional active tracking. An example is the recording and display of a test event involving a missile intercepting a target. The missile, target, and an instrumentation site all receive GPS signals. The signals are time tagged and the data contained thereon verified by a source and forwarded from each platform to a ground station. The data is correlated with other test data to provide a real time record and display of the missile intercepting the target. Both Time Space Position Information (TSPI) and Miss Distance Indication (MDI) are derived to a very high degree of accuracy using double difference error correction techniques. Both absolute and relative position information can be derived.

20 Claims, 5 Drawing Sheets

TRACKING SYSTEM FOR PROVIDING POSITION INFORMATION

This application is a continuation-in-part of U.S. patent application Ser. No. 09/488,594 filed Jan 24, 2000, now abandoned.

BACKGROUND OF THE INVENTION

1. Field of the Invention

The present invention relates generally to a tracking system for tracking the position of a target and a missile pursuing the target. More particularly, the present invention relates to a tracking system means for determining the dynamic positions of a target and a missile tracking the target passively by correlating multiple GPS signals and event-related data.

2. Description of the Prior Art

There is a continued pressure on the military to deliver high performance weapon systems with quantifiable performance characteristics. It is expected that these weapons systems can be procured at a cost which is comparable to presently available weapon systems. Testing, in particular flight test on a full-scale range, is a major contributor to the cost of procuring a high performance system. Any opportunity to reduce test costs and thereby save defense funds for other purchases such as weapons systems is welcomed by the military.

Conventional range testing is heavily reliant on radar and optical instrumentation to provide Time, Space, Position Information (TSPI) and Miss Distance Indication (MDI) or Vectoring Scoring (VS) data. These conventional fixed systems are expensive to procure, operate, and maintain and represent a "sunk cost" independent of usage of a range testing facility. Further, the manpower needed to operate these complex range testing facilities must be available at odd hours of the day in order to meet mission requirements, necessitating the payment of overtime to specially trained operators in many cases. Also, the mobility, positioning and coverage of range testing systems is dependent on terrain. Communications among the many operators also calls for an elaborate secure communications network to be procured, maintained and operated. Finally, the ability to conduct tests in a secure mode is also severely constrained when using a specific active emitter, such as a radar, for a specified duration and readily identifiable location. A preferred embodiment of the present invention addresses each of the above deficiencies in a cost effective, reliable, and efficient package.

SUMMARY OF THE INVENTION

The present invention overcomes some of the disadvantages of the past including those mentioned above in that it comprises a relatively in design yet highly efficient and effective tracking system for providing position information relative to a missile in flight tracking a target by correlating multiple satellite generated GPS signals and event-related data. Raw position data, generated from GPS receivers onboard a moving target and a missile tracking the target, is supplied to a ground station in a IRIG (Interrange Instrumentation Group) encrypted compatible data string. To properly correlate the data and eliminate any errors in the data, a ground station GPS receiver also collects raw position data as well as emphmeris data of all the satellites in view at the ground station. The data is processed using double difference error correction techniques for post mission real time processing and kinematic processing.

A preferred embodiment of the present invention integrates a "semi-passive tracking" subsystem into test range instrumentation and test vehicles to provide very accurate position information. Position data is obtained by data merged from multiple Global Positioning System (GPS) receivers with instrumentation data telemetered to the ground station.

The term "semi-passive tracking" is used to denote that although "active" signals from GPS satellites are used, their use is not traceable to a specific test or event since anyone can use these signals at any time. Unlike radars that emit signals and track objects for a specific purpose, and thus provide a fully active signal capable of being monitored, the GPS signals are always there.

The ground station or analysis site is normally a fixed location, but can be mobile such as a vehicle, given the unique capabilities that the present invention provides. The unique integration of receivers for intercepting GPS signals with existing systems allows development of an accurate reproduction of the test event. Further, it can be accomplished inexpensively, and in a very secure mode at remote locations, if necessary, to address unique mission requirements.

Each test article such as a missile or target and its instrumentation system location is precisely known at any given moment in time, by transmitting the raw GPS data and IMU measurements in "real time" to an analysis site or ground station where the GPS data is differentially corrected to merge the IMU data. At the site, which also has its own GPS receiver for generating its own position data, the GPS position information is then merged with other test data thus fixing the dynamic position of all elements engaged in the test. By dynamic position is meant the location and attitude of an article correlated to a given moment in time. Even the location and attitude of one test article relative to other test articles can be obtained by post-processing of the data.

Each test articles is fitted with a GPS receiver capable of intercepting GPS signals from a satellite. These receivers are built to withstand the test environment and have unique message formatting capabilities for transmitting raw GPS measurement data to a ground station. A pre-amplifier is added to each receiver to amplify the GPS signal. The GPS signal is then input to an onboard encoder where a data validation bit is added together with a timing bit and the entire data stream is telemetered as an encrypted signal to an analysis site where data from other test articles and range instrumentation is merged.

Test data is provided to the ground station, in near real time, for input to formal evaluations of a weapon system, such as a missile, as it flies an actual test mission.

DETAILED DESCRIPTION OF THE PREFERRED EMBODIMENTS

Figure 1:
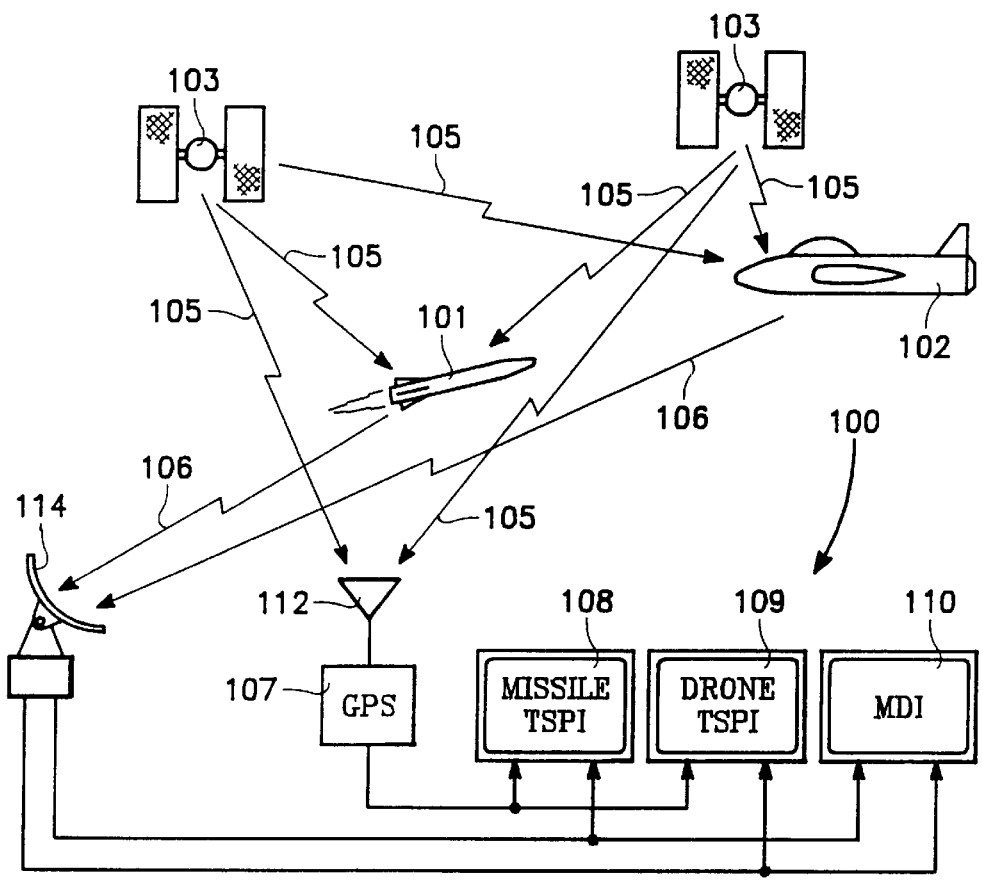
FIG. 1 depicts the flow of data from a missile and a target to a ground station for a test setup using a preferred embodiment of the present invention.

Referring first to FIG. 1, there is shown a schematic diagram which depicts the RF signal flow path 106 of position data from a missile 101 and a target 102 to a receiving antenna 114 located at a ground or tracking station 100 for processing by the ground station 100. Ground station 100 also has a GPS receiver 107 and its associated antenna 112 which allows the ground station to receive and process GPS position data transmitted from GPS satellites 103 to antenna 112 via GPS signal flow paths 105. Satellites 103 also transmit GPS data to the missile 101 and the target 102. The missile 101 may be a Sidewinder missile and the target 102 may be an MQM-107 drone.

Figure 3:
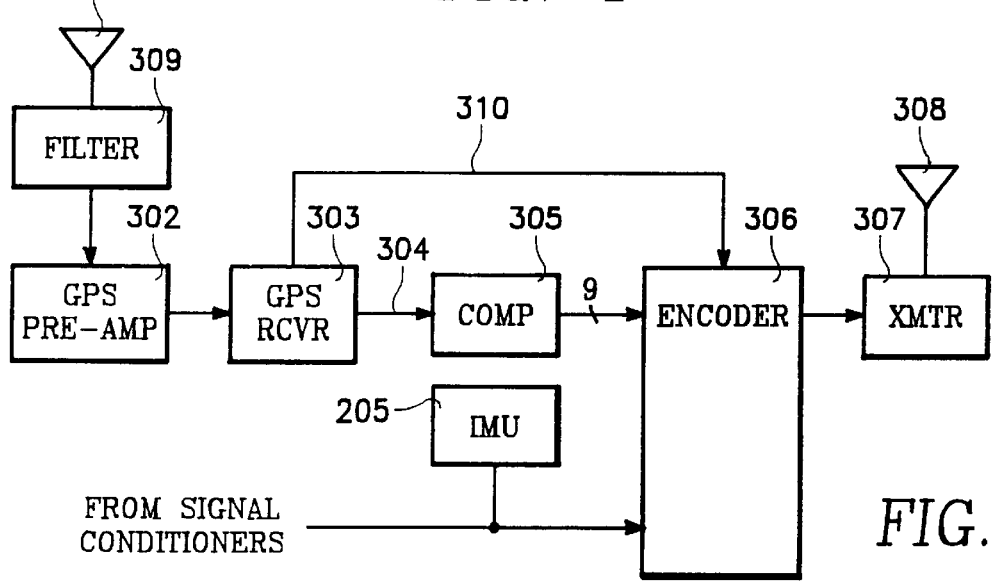
FIG. 3 is an electrical block diagram of a portion of a preferred embodiment of the present invention as installed in a missile.
Figure 2:
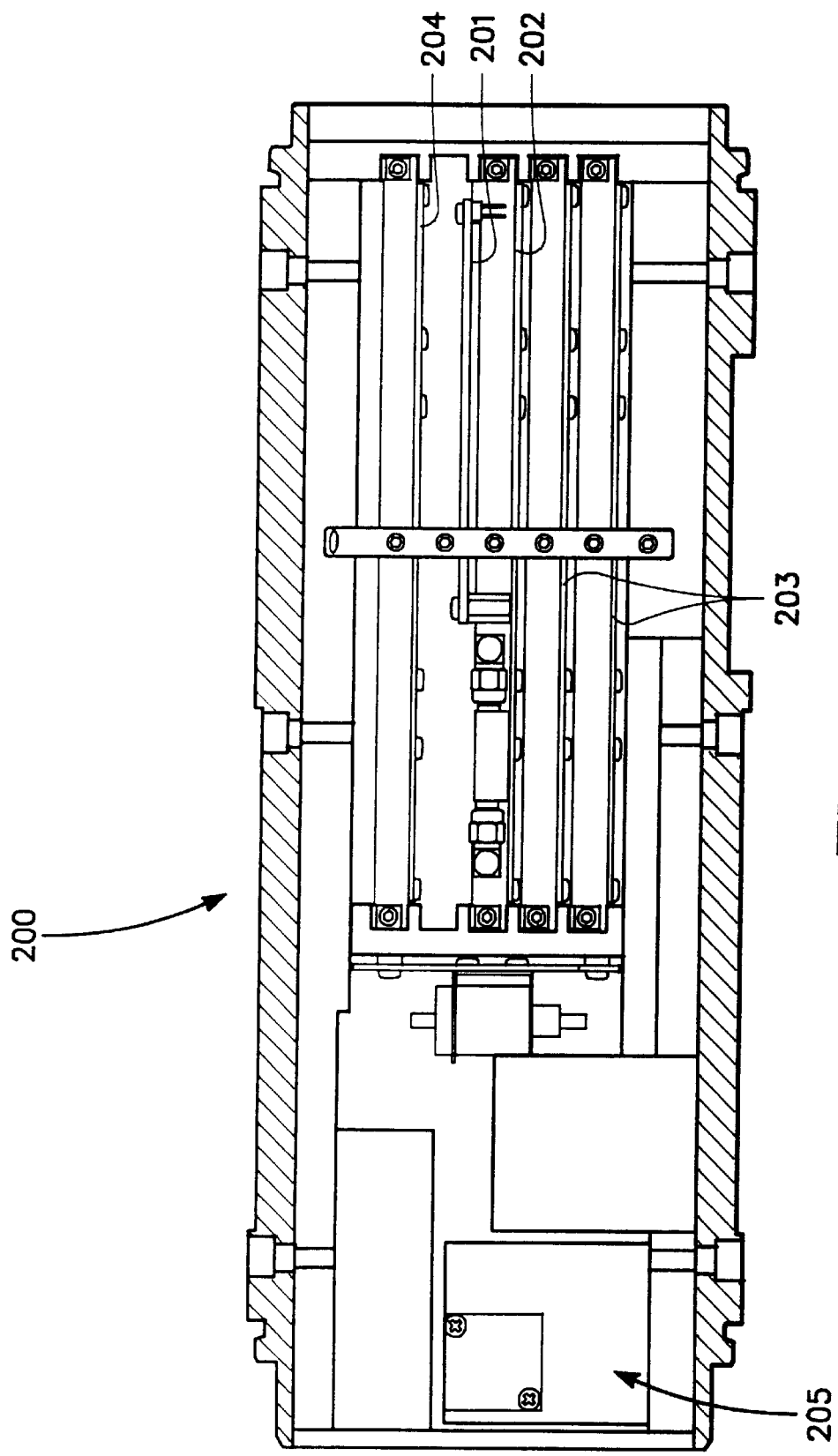
FIG. 2 is a view of modifications made to a telemetry unit on board a missile in order to install a portion of a preferred embodiment of the present invention.

Referring to FIGS. 1, 2 and 3 missile 101 has on board an AN/DKT-80 missile telemetry system 200 that is modified to include an inertial measurement unit (IMU) 205. Receiver 303 is interfaced with the missile telemetry system 200. In addition to the standard parameters measured by missile telemetry system 200, added telemetered signals include Pitch, Yaw, and the GPS position data supplied to the GPS receiver 303. The modified missile telemetry system 200 for use with GPS receiver 303 includes: (1) a GPS interface circuit added to a Frequency Select Card 202; (2) the GPS receiver (identified by the reference numeral 201 in FIG. 2) added to the mother board in place of the original Frequency Select Card; (3) Pitch and Yaw rate sensors (not shown); and (4) a BOA power distribution board (not shown) added to power the additional sensors.

The additional rate sensors provide a six degree of freedom (DOF) Inertial Measurement Unit 205 so that postprocessing of position data will permit improved position update rates with the use of a Kalman filter since the GPS receiver provides position updates at 20 Hz. The missile telemetry system 200 also includes a pair of signal conditioners 203, an encoder 204, and a frequency select board 202 that is used to store the transmitted frequency in non-volatile random access memory (NVRAM).

Referring to FIGS. 1 and 3, missile 101 is modified to incorporate a GPS receiver 303. The receiver 303 used in missile 101 is an ASHTECH G12 High Dynamic Missile Application (HDMA) GPS receiver board 303 available from Thales Navigation (formally Magellan Corporation) of Santa Clara, Calif. Receiver 303 is a twelve channel receiver which allows for a selectable rate of 20 Hz for real time guidance, tracking position and raw data. Receiver 303 also allows for all-in-view tracking of up to twelve satellites with a loss of lock re-acquisition time of less than two seconds.

A GPS signal from satellite 103 is received at a GPS antenna 301, and then supplied a filter 309 which supplies its output to a pre-amplifier 302. Filter 309 prevents saturation of pre-amplifier 302 allowing the pre-amplifier to amplify the GPS signal. Pre-amplifier 302 has an amplification/gain of about 25 dB which is the gain required by GPS receiver 303. The Antenna 301 is a dual-band wrap around antenna which has an L1 element which receives GPS signals and S band antenna which functions as the transmitting antenna 308 for missile 101. The dual band wrap around antenna which is mounted upon and used by missile 101 is manufactured by HAIGH-FARR of Salem, N.H.

In order to accurately measure position of missile 101 for 20 Hz updates, the phase center of the antenna 301 is determined. The phase center of antenna 101 is measured at about 1.5 inches aft of the GPS antenna connector and on the surface of the missile 101. All GPS measurements are made from the phase centers of the antennas which requires that phase centers must be accurately measured.

The GPS receiver 303 provides GPS position data in an RS-232 MACM (Missile Application Condensed Measurements Record) format and supplies the MACM formatted data to a microcontroller 305 via an RS-232 data line 304. Microcontroller 305 has a UART (universal asynchronous receiver/transmitter) which receives the MACM formatted data serially and than converts the MACM formatted data to a nine bit parallel format (illustrated in FIG. 4) prior to supplying the position data to encoder 306. Microcontroller 305 may being any commercially available computer which would fit within the limited space available in missile 101.

The ASHTECH G12 receiver has two RS-232 ports. Port A is used for telemetry data. Port B is brought out to a service connector (not separately shown) located under a hatch in the skin of the missile 101 at a location (not separately shown) of the onboard telemetry (TM) system 200. This connector is used to configure the ASHTECH G12 receiver. A holding battery (not separately shown) saves the configuration.

Figure 4:
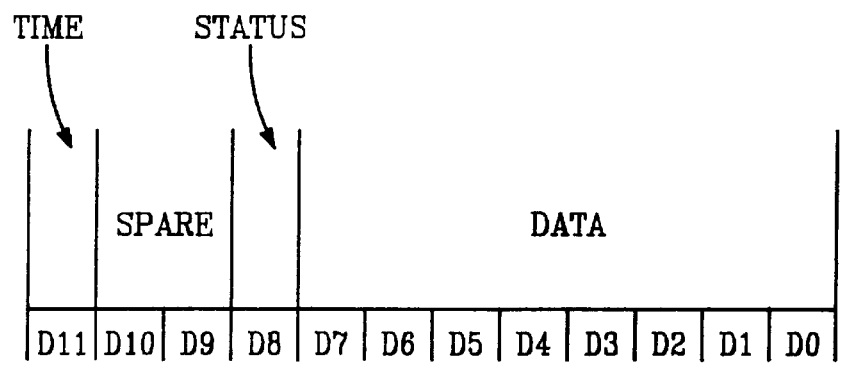
FIG. 4 depicts the Data Word format for transmitting position data to a ground station.

Modifications were made to the format of the telemetered data to accommodate two added rate sensors and GPS data. The bit rate was increased from 1 MBs to 1.25 MBs and the common word size is a 12-bit word which is illustrated in FIG. 4. The receiver 303 normally uses 8-bit words at a 115.2K-baud rate. To process data at this rate, the GPS data word is sampled at 20,000 samples per second (20 KS/s).

As shown in FIG. 4, the first eight bits of data D0–D7 of each twelve bit byte contain the GPS MACM formatted data from receiver 303. The ninth bit D8, is a status bit which verifies that the 8-bit GPS data word is a valid new word. When the ninth bit D8 is a logic one, the 8-bit GPS data word is a valid word. Similarly, when the ninth bit D8 is a logic zero, the 8-bit GPS data word is a non-valid word which results in the word not being processed at the ground station 100.

Receiver 303 provides a timing bit D11 which is supplied to encoder 306 via a data line 310. Bit D11 is a timing bit which is sampled about every 60 microseconds to determine its logic state. The rising edge of the D11 bit(logic zero to one transition) indicates when GPS time has been incremented by one second. Bit D11 allows all data to be correlated with GPS time. For example, Bit D11 enables the time correlation of the GPS data with the IMU 205 data in post processing. Ten MACM messages are generated by receiver 303 between the time Bit D11 first transitions to the logic one state and the time bit D11 again transitions to the logic one state. Bits D9 and D10 are unused or spare bits.

Encoder 306 receives the nine bit parallel MACM messages from microcontroller 305 encrypts the messages and provides the messages in a pulse code modulated (PCM) format to a transmitter 307. Transmitter 307 transmits the GPS position data to ground station 100, using S-band antenna 308.

Figure 5:
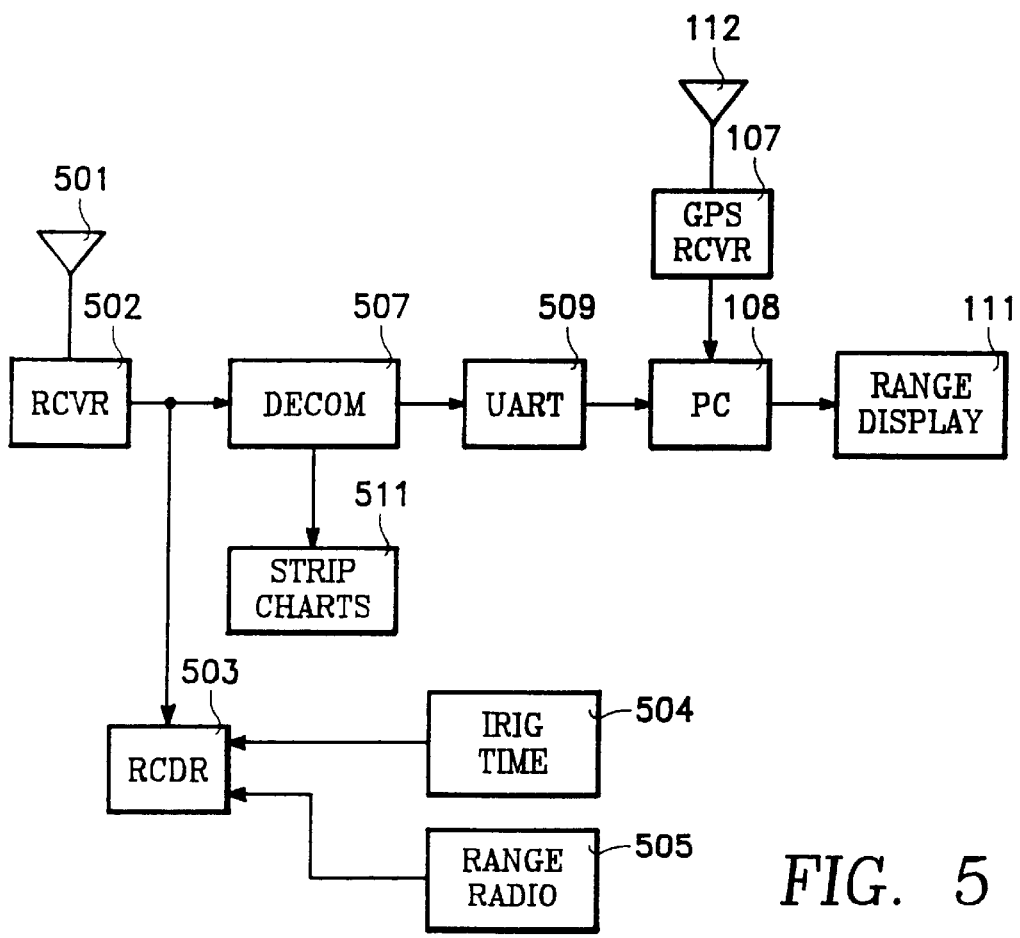
FIG. 5 is an electrical block diagram incorporating a portion of a preferred embodiment of the present invention in a ground station associated with receiving an processing data from a missile.

Referring now to FIGS. 1 and 5, FIG. 5 is an illustration of the electrical components located at the ground station 100 for receiving and processing GPS position data from missile 101. The GPS position data from missile 101 and drone 102 is received at a TM antenna 501 located at ground station 100 and forwarded to a receiver 502. The GPS position data is supplied to a recorder 503 and then recorded on recorder 503 along with an IRIG timing signal 504 and a range radio signal 505. The GPS position data is also supplied to a decommutator 507. Decommutator 507 which receives the GPS position data in a PCM data stream decommutates or breaks out the PCM data stream into its individual words. Decommutator 507 includes a parallel port which is connected to a UART 509. Decommutator 507 is also connected to at least one strip chart 511.

Decommutator 507 supplies the GPS position data which is in a parallel format to UART 509 which converts the data to an RS-232 data stream prior to supplying the GPS position data to a personal computer 108. Current state of the art decommutators can output GPS data directly to an RS-232 Ethernet port which eliminates the UART shown in FIG. 5.

At this time it should be noted that decommutator 507 is a Loral ADS-550 decommutator manufactured by Loral Space and Communications of New York, N.Y. which was used to demonstrate operability of a preferred embodiment of the present invention.

There is also a GPS antenna 112 and a GPS receiver 107 located at the ground at station 100. The GPS receiver 107 at the ground station 100 operates as a reference receiver providing satellite generated GPS position data without errors to computer 108. Since GPS receiver 107 is non-moving, computer 108 has fixed reference GPS position data provided which computer 108 processes to insure position accuracy within approximately 3–10 centimeters. The position data output by computer 108 is supplied to a range display 111 which then displays the location of missile 101. Computer 108 also includes a display (illustrated in FIG. 1) which displays Time, Space, and Position Information for missile 101.

The telemetered GPS data is converted back into an RS-232 data stream/signal at a rate of 115.2K-baud, reversing the conversion process performed by the telemetry system 200 of missile 101. There is also a check to see if the valid bit $D_8$ has been set. If bit $D_8$ has been set, then the bit is sent through the UART 509 where it is converted into the RS-232 format originally output from receiver 303 (FIG. 3). Personal Computer 108, receives the GPS signal in the original format output by receiver 303 and thereby responds as if missile 101 is communicating its position directly with computer 108. The GPS receiver 107 also in communicates directly with personal computer 108, enabling computer 108 to calculate a Double Difference GPS correction which insures that position information relative to missile 101 is accurate within approximately 3–10 centimeters.

Figure 6:
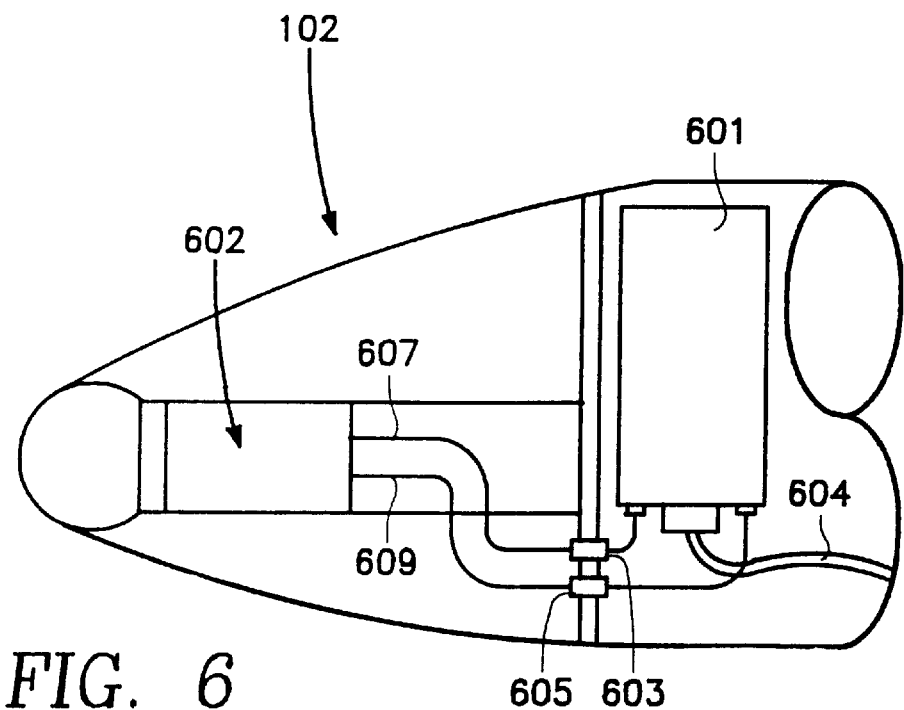
FIG. 6 depicts a layout of a portion of a preferred embodiment of the present invention as installed in a drone or target.

Referring to FIGS. 1 and 6, FIG. 6 depicts the location of an ASHTECH G12 receiver, packaged with its associated telemetry, within the target/drone 102 as installed in the altimeter's housing 601 of target 102. The telemetry system sends only the data output by the G12 receiver. The location of the dual-band antenna 602 is in the radome (forward part of the nose of target 102). The dual band antenna 602 is a wrap around antenna having a 5-inch diameter, which incorporates an L-band antenna for receiving the GPS data from satellites 103 and an S-band antenna which operates as the telemetry transmitter antenna.

Figure 7:
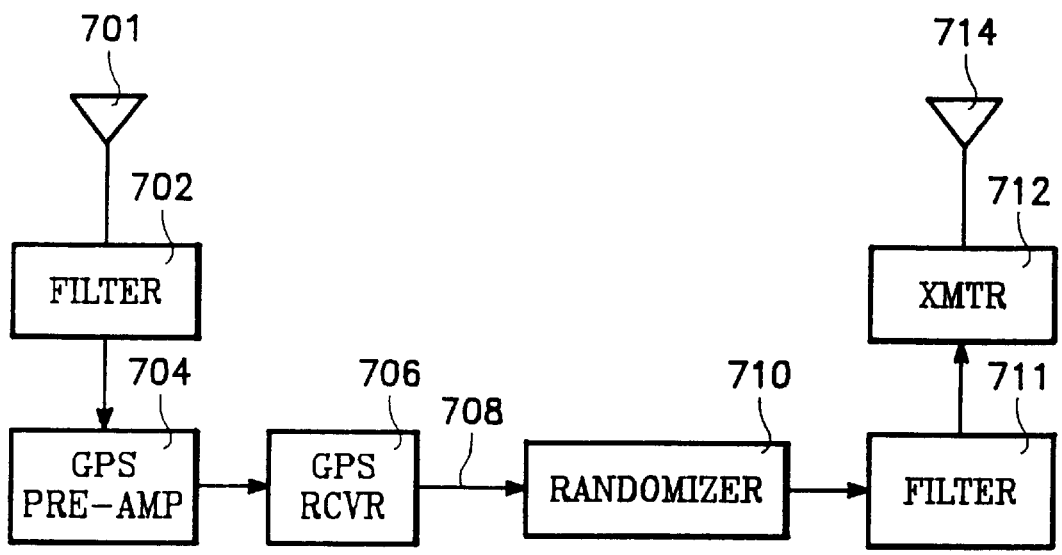
FIG. 7 is an electrical block diagram of a portion of a preferred embodiment of the present invention as installed in a drone or target.

Referring now to FIGS. 1, 6 and 7, as shown in FIG. 7, the L-band antenna is antenna 701 and the S-band antenna is antenna 714. L-band antenna 701 is connected to a filter 702 which is connected to a pre-amplifier 704, also located in the nose. The pre-amplifier 704 amplifies the GPS signal for use by receiver 706 and telemetry package located in the altimeter housing 601. Filter 702 prevents saturation of pre-amplifier 704 allowing the pre-amplifier to amplify the GPS signal. Pre-amplifier 704 has an amplification/gain of about 25 dB which is the gain required by GPS receiver 706. The GPS receiver 706 provides GPS position data in the RS-232 MACM (Missile Application Condensed Measurements Record) format and supplies the MACM formatted data to an RS-232 to TTL converter/randomizer 710. Randomizer 710 converts the GPS data which is ±12 VDC to TTL logic levels of zero to five volts DC. Randomizer 710 also randomizes the GPS position data which is burst data. Randomizer 710 insures a state transition (e.g. 0 VDC to 1 VDC) within the GPS data stream since burst data includes lengthy streams of zeros between MACM messages. Transmitter 712 is adapted to receive data at TTL logic levels prior to antenna to transmission of the GPS position data to ground station 100. Filter 711 is a 3-pole Bessel pre-mod filter set to 0.7 times the bit rate. Filter 711 deviates the transmitter 712 with a peak-to-peak (p2p) deviation of 0.7 times the bit rate and is part of transmitter 712.

The L-band antenna 701 is connected to the telemetry package within housing 601 via a GPS data line 609 and bulkhead connector 605, while the S-band antenna 714 is connected to the telemetry package within housing 601 via a data line 607 and bulkhead connector 603. The phase center of antenna 602 was measured and found to be about 2 inches aft of the antenna on the surface of the 5-inch diameter mounting tube of the antenna. The port B of the receiver 706 (not shown in FIG. 6) is also brought out to the radome, providing access to the receiver 706 for configuration and checkout prior to flight. A switch on the target's control panel (not shown) for activating the altimeter now activates the receiver and associated telemetry using existing cable 604.

Figure 8:
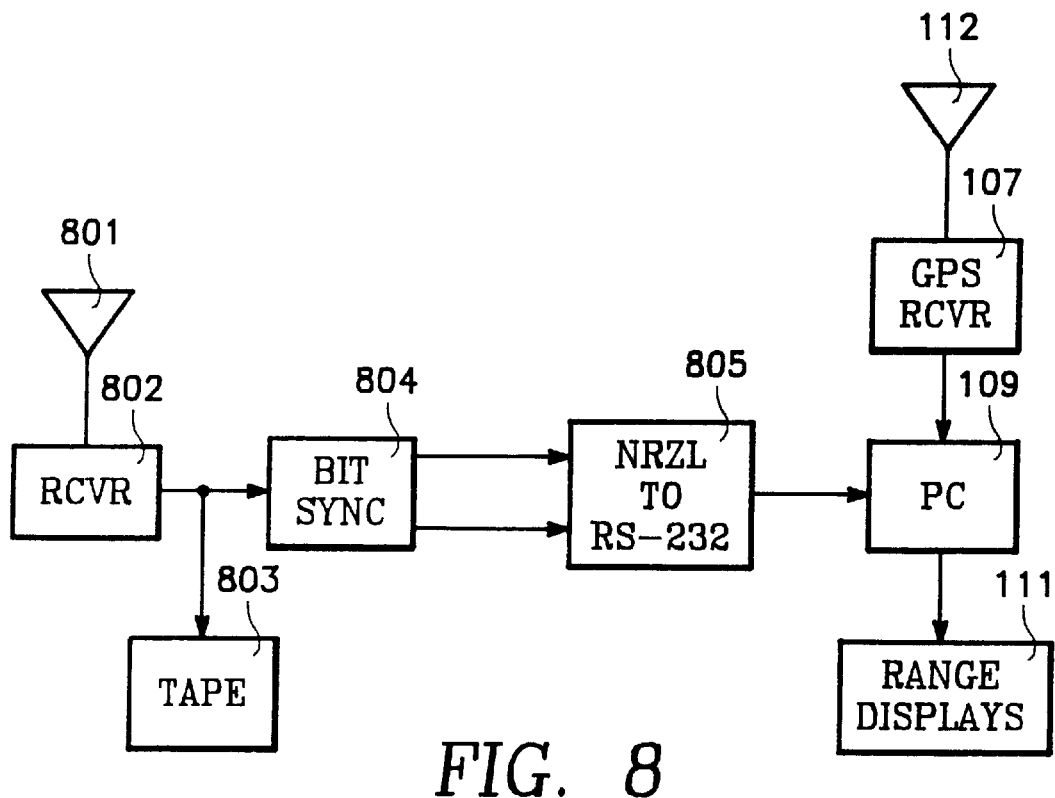
FIG. 8 is an electrical block diagram incorporating a portion of a preferred embodiment of the present invention in a ground station associated with receiving an processing data from a target.
Figure 9:
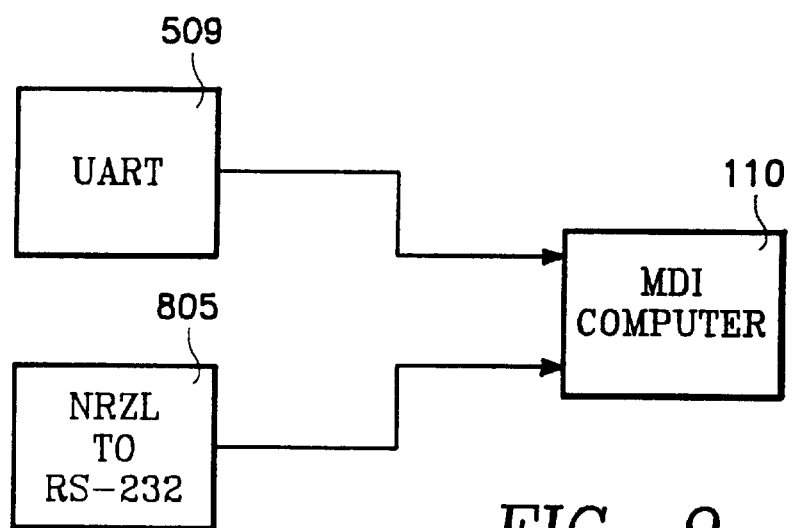
FIG. 9 is a block diagram depicting the interface of missile and target ground station data to a computer for further processing.

Referring to FIGS. 1, 5 and 8, in addition to the missile support equipment (illustrated in FIG. 5) at the ground station 100, the target 102 requires supporting equipment at the ground station 100. FIG. 8 is a block diagram of the target's GPS ground station support equipment. The telemetered GPS position data/signal from target 102 is received by the S-band antenna 801, forwarded to the receiver 802 and from there is sent to a bit sync circuit 804 and a tape recorder 803. The GPS position data/signal is recorded at recorder 803 as a video signal which is output from the receiver 802. The signal is also sent to bit sync circuit 804 where it is de-randomized, creating an NRZL (non-return to zero logic) data stream and a clock signal which is a synchronized clock signal. The NRZL data and clock are supplied to a decoder 805 for conversion from NRZL to RS-232 data and subsequent processing by a personal computer 109 that also receives reference GPS data from the ground station GPS receiver 107 and its associated GPS antenna 112. The reference GPS data is used by personal computer 109 to eliminate position errors due the atmosphere or other conditions which may result in position data which is not accurate. The position data output by computer 109 is supplied to a range display 111 which then displays the location of target 102. Computer includes a display (illustrated in FIG. 1) for displaying Time, Space and Position Information for target 102.

Referring to FIGS. 1, 5, 8 and 9, FIG. 9 is a block diagram of the electrical components within the ground station 100 for the miss distance indicator (MDI) processing, display, and archiving. This diagram is a continuation of FIGS. 5 and 8. From the UART 509 located at ground station 100 (FIG. 7) and the NRZL-to-RS-232 decoder 805 located at ground station 100 (FIG. 8), two RS-232 data streams are provided to personal computer 110 where one of the two RS-232 data streams is chosen as the reference. A double difference error correction is made on these two streams in the same manner as processed for the missile and drone Time, Space, and Position Information. Personal Computer 110 then displays via a display which is illustrated in FIG. 1 and also archives the MDI data.

The MACM message provided by receiver 303 on board missile 101 and receiver 706 on board target 102 has the following response format.

locked and the number 5 means the beginning of the first frame has been found. CNO is a one byte message which signal-to-noise data of satellite observation. PHASE is an eight byte message of full carrier phase measurements in cycles. RANGE is a four byte message which includes raw_range G-8 ITA record having a pseudo range in seconds. DPL is a doppler MCA record which is 10–4 Hz. LCK_TIME is a continuous count since the satellite is locked. This number is incremented about 500 times per second. Checksum is a checksum an exclusive OR of all bytes from the count just after the header to the byte before the checksum.

Raw GPS position data is contained the messages PHASE, RANGE, DPL and LCK_TIME.

Software packages allow comparison of GPS position data from missile 101 and drone 102 to that received at the ground station 100. From this comparison, a real time TSPI solution is created. Software also enables creation of miss distance indication information for missile 101 engagement of drone 102.

Software from several packages is used to process various portions of the data. Software for real time processing of

| | |
|---|---|
| [MACM:4][COUNT:2][RCVTIME:4][NAVT:4] | Header: 14 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [PRN:1][WRN:1][POL:1][CNO:1][PHASE:8][RANGE:4][DPL:4][LCK_TIME:4] | Prn Data: 24 |
| [CHECKSUM:1] | Checksum: 1 |

The total message length for eight SV measurements is 207 bytes of data.

Bytes 1–5 of the MACM message [MACM:4] is the name of the message which includes a sync_word (ASCII "MACM"). Bytes 5 and 6 of the MACM message [COUNT:2] identifies the number of structures (PRN record) to be sent for the current epoch Bytes 7–10 of the MACM message [RCVTIME:4] comprises a signal received in milliseconds of week GPS system time and is the lag time for all measurements and position data. Bytes 11–14 of the MACM message [NAVT:4] comprises a receiver clock offset in meters. Beginning with byte 15 of the MACM message and continuing to the end of the MACM message, which is variable in length, the following data is provided:

1. PRN is a one byte message which identifies a Satellite PRN number.
2. WRN is a one byte message which is a Warning Flay where setting bit 1 and/or bit 2 results in the following:

| Bit 1 | Bit 2 | |
|---|---|---|
| 0 | 0 | Same as 22 in goodbad flag (see next field) |
| 1 | 0 | Same as 23 in goodbad flag |
| 0 | 1 | Same as 24 in goodbad flag |

When bit 3 is set carrier phase is questionable; when bit 4 is set code phase is questionable; when bit 5 is set code phase integration is questionable; bit 6,is not used; when bit 7 is set there is a possible loss of lock; and when bit 8 is set there is a loss of lock counter reset.

3. POL is a one message comprising a number which is either 0 or 5. The number zero means the satellite is just data for real time differential correction and post mission scoring of missile performance is provided by WAYPOINT CONSULTING, INC. of Calgary, Canada. Two packages are used for post mission processing: MULTI-SENSOR OPTIMAL SMOOTHER ESTIMATING SOFTWARE (MOSES) and WIDE AREA DIFFERENTIAL GPS (WADGPS). MOSES merges the GPS position data and IMU data with a Kalman filter and performs kinematic processing, providing much higher update rates for missile performance estimates.

Real time differential processing of missile 101 and drone 102 performance is performed using raw GPS measurements (e.g., pseudorange, carrier phase, and Doppler) in the Missile Application Condensed Message (MACM) format downlinked at 20 Hz from missile 101 and drone 102. Personal computer 108 receives data in real time from the missile 101 and the ground station reference GPS receiver 107 simultaneously. A Double Difference Pseudorange navigation solution is formed and the position of missile 101 relative to the test range boundaries is displayed on the computer 108. Personal computer 108 also logs the missile 101 and ground GPS reference receiver 107 MACM messages to files. An ephemeris message is also logged from the ground station GPS reference receiver 107. This sequence is carried out simultaneously, though separately, for drone 102 on personal computer 109.

On personal computer 110 a Double Difference solution, yielding relative positions of drone 102 and missile 101, is composed. Supplying the time-variant position data of missile 101 relative to drone 102, enables formation of an miss distance indicator database for a flight test. Choosing drone 102 as the reference GPS receiver, a solution can be produced for an miss distance indicator based score for missile 101 relative to drone 102 in a moving East-North-up coordinate system with origin at the phase center of the drone's GPS antenna. This is referred to as a moving baseline and is performed by post processing the logged missile and drone data.

As an alternative, the data is converted to a correct data protocol and sent to the range control center to provide a real time Independent Tracking Aid. This is very useful for insuring range safety.

Real time differential results based upon a double difference error correction pseudorange navigation solution are estimated to yield accuracy of ±3 meters. Post mission processing of recorded data in the MACM messages uses pseudorange and carrier phase measurements to estimate integer ambiguities with kinematic processing and Kalman filtering of the IMU data. This will permit accuracy yields of 1 foot or less and measure missile altitude to less than ±0.5 degrees.

From the foregoing, it may readily be seen that the present invention comprises a new, unique and exceedingly useful tracking system for providing position information which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A tracking system for providing position information to a ground station relating to movement of a missile and a target, said missile tracking said target on an interception course to intercept said target, said tracking system comprising:

first Global Positioning System (GPS) receiving antenna means mounted upon said missile for receiving GPS position data from a plurality of satellites;

first amplifying means for amplifying said GPS position data received by said first GPS receiving antenna means;

first GPS receiver means for processing said GPS position data amplified by said first amplifying means and then generating an a first set of RS-232 Missile Application Condensed Measurements Records which includes said GPS position data amplified by said first amplifying means;

encoding means for encoding said first set of RS-232 Missile Application Condensed Measurements Records;

first telemetry transmitting means mounted upon said missile for transmitting to said ground station said first set of RS-232 Missile Application Condensed Measurements Records, said first set of RS-232 Missile Application Condensed Measurements Records being transmitted to said ground station in a first pulse code modulated data stream;

second GPS receiving antenna means mounted within a radome of said target for receiving GPS position data from said plurality of satellites;

second amplifying means for amplifying said GPS position data received by said second GPS receiving antenna means;

second GPS receiver means for processing said GPS position data amplified by said second amplifying means and then generating an a second set of RS-232 Missile Application Condensed Measurements Records which includes said GPS position data amplified by said second amplifying means;

randomizing means for converting said second set of RS-232 Missile Application Condensed Measurements Records from first direct current voltage levels to second direct current voltage levels to allow for transmission of said second set of RS-232 Missile Application Condensed Measurements Records to said ground station, said randomizing means randomizing said second set of RS-232 Missile Application Condensed Measurements Records including said GPS position data contained therein;

second telemetry transmitting means mounted upon said target for transmitting to said ground station said second set of RS-232 Missile Application Condensed Measurements Records, said second set of RS-232 Missile Application Condensed Measurements Records being transmitted to said ground station in a second pulse code modulated data stream;, first telemetry receiving antenna means located at said ground station, said first telemetry receiving antenna means receiving said first set of RS-232 Missile Application Condensed Measurements Records from said missile;

decommutator means for decommutating first pulse code module data stream into a plurality of missile GPS data words having said first set of RS-232 Missile Application Condensed Measurements Records included therein;

first converting means for converting said plurality of missile GPS data words from a parallel format to an RS-232 data serial format;

third GPS receiving antenna means located at said ground station for receiving GPS position data from said plurality of satellites;

third GPS receiver means located at said ground station, said third GPS receiver means operating as a fixed position reference receiver to insure position accuracy of said GPS position data received by said third GPS receiver means, said third GPS receiver means providing a third set of RS-232 Missile Application Condensed Measurements Records which includes said GPS position data received by said third GPS receiver means, said third set of RS-232 Missile Application Condensed Measurements Records including a position accuracy range;

first computer means for receiving said plurality of missile GPS data words and said third set of RS-232 Missile Application Condensed Measurements Records, said first computer means processing said plurality of missile GPS data words and said third set of RS-232 Missile Application Condensed Measurements Records to provide missile time, space and position information, said first computer means including a missile location display for displaying said missile time, space and position information;

second telemetry receiving antenna means located at said ground station, said second telemetry receiving antenna means receiving said second set of RS-232 Missile Application Condensed Measurements Records from said target;

bit sync circuit means for de-randomizing said second set of RS-232 Missile Application Condensed Measurements Records to create a non-return to zero logic data stream having a plurality of target GPS data words and a synchronized clock signal;

second converting means for converting said non-return to zero logic data stream having said plurality of target GPS data words included therein to an RS-232 serial data stream having said plurality of target GPS data words included therein; and second computer means for receiving said plurality of target GPS data words and said third set of RS-232 Missile Application Condensed Measurements Records, said second computer means processing said plurality of target GPS data words and said third set of RS-232 Missile Application Condensed Measurements Records to provide target time, space and position information, said second computer means including a target location display for displaying said time, space and position information.

2. The tracking system of claim 1 further comprising a miss distance indicator computer connected to said first converting means to receive said plurality of missile GPS data words from said first converting means, said miss distance indicator computer connected to said second converting means to receive said plurality of target GPS data words from said second converting means, said miss distance indicator computer including computer software to process said plurality of missile GPS data words and said plurality of target GPS data words and to calculate miss distance indicator data for said missile relative to said target as said missile tracks said target on said interception course to intercept said target, said computer software calculating said miss distance indicator data using a double difference correction technique.

3. A tracking system for providing position information to a ground station relating to movement of a missile and a target, said missile tracking said target on an interception course to intercept said target, said tracking system comprising:

a first Global Positioning System (GPS) receiving antenna having an output, said first GPS receiving antenna being mounted upon said missile;

a first filter having an input connected to the output of said first GPS receiving antenna and an output, said first filter being mounted within said missile;

a first amplifier having an input connected to the output of said first filter and an output, said first amplifier being mounted within said missile;

a first GPS receiver having an input connected to the output of said first amplifier, a first output and a second output, said first GPS receiver being mounted within said missile;

a microcontroller having an input connected to the first output of said first GPS receiver and an output, said microcontroller being mounted within said missile;

an encoder having a first input connected to the output of said microcontroller, a second input connected to the second output of said first GPS receiver, a third input and an output, said encoder being mounted within said missile;

a first transmitter having an input connected to the output of said encoder and an output, said first transmitter being mounted within said missile;

a first transmitting antenna having an input connected to the output of said first transmitter, said first transmitting antenna being mounted upon said missile;

a second GPS receiving antenna having an output, said second GPS receiving antenna being mounted within a radome of said target;

a second filter having an input connected to the output of said second GPS receiving antenna and an output, said second filter being mounted within said target;

a second amplifier having an input connected to the output of said second filter and an output, said second amplifier being mounted within said target;

a second GPS receiver having an input connected to the output of said second amplifier and an output, said second GPS receiver being mounted within said target;

a randomizer having an input connected to the output of said second GPS receiver and an output; said randomizer being mounted within said target;

a third filter having an input connected to the output of said randomizer and an output, said third filter being mounted within said target;

a second transmitter having an input connected to the output of said third filter and an output, said second transmitter being mounted within said target;

a second transmitting antenna having an input connected to the output of said second transmitter, said second transmitting antenna being mounted within said target;

a first telemetry receiving antenna having an output, said first telemetry receiving antenna being located at said ground station;

a first telemetry receiver having an input connected to the output of said first telemetry receiving antenna and an output, said first telemetry receiver being located at said ground station;

a decommutator having an input connected to the output of said first telemetry receiver a first output and a second output, said decommutator being located at said ground station;

a universal asynchronous receiver/transmitter having an input connected to the first output of said decommutator and output, said universal asynchronous receiver/transmitter being located at said ground station;

a first personal computer having a first input connected to the output of said universal asynchronous receiver/transmitter, a second input and an output, said first personal computer being located at said ground station;

a third GPS receiving antenna having an output, said third GPS receiving antenna being located at said ground station;

a third GPS receiver having an input connected to the output of said third GPS receiving antenna and an output connected to the second input of said first personal computer, said third GPS receiving antenna being located at said ground station;

a second telemetry receiving antenna having an output, said second telemetry receiving antenna being located at said ground station;

a second telemetry receiver having an input connected to the output of said second telemetry receiving antenna and an output, said second telemetry receiver being located at said ground station;

a bit sync circuit having an input connected to the output of said second telemetry receiver, a data output and a clock output, said bit sync circuit being located at said ground station;

a decoder having a data input connected to the data output of said bit sync circuit, a clock input connected to the clock output of said bit sync circuit and an output, said decoder being located at said ground station; and a second personal computer having a first input connected to the output of said decoder, a second input connected to the output of said third GPS receiver and an output.

4. The tracking system of claim 3 further comprising a range display having a first input connected to the output of said first personal computer and a second input connected to the output of said second personal computer, said range being located at said ground station, said range display displaying a location for said target and said missile as said missile travels on said interception course to intercept said target.

5. The tracking system of claim 3 further comprising an inertial measurement unit having an output connected to the third input of said encoder, said inertial measurement unit being mounted within said missile.

6. The tracking system of claim 3 further comprising a strip chart having an input connected to the second output of said decommutator.

7. The tracking system of claim 3 further comprising a recorder having a first input connected to the output of said first telemetry receiver, a second input for receiving an Interrange Instrumentation Group timing signal and a third input for receiving a range radio signal.

8. The tracking system of claim 3 further comprising a miss distance indicator computer having a first input connected to the output of said universal asynchronous receiver/transmitter and a second input connected to the output of said decoder.

9. The tracking system of claim 8 wherein said miss distance indicator computer includes computer software for calculating miss distance indicator data for said missile relative to said target as said missile tracks said target on said interception course to intercept said target, said computer software calculating said miss distance indicator data using a double difference correction technique.

10. The tracking system of claim 3 wherein said first personal computer includes a display for displaying Time, Space and Position Information for said missile.

11. The tracking system of claim 3 wherein said second personal computer includes a display for displaying Time, Space and Position Information for said target.

12. The tracking system of claim 3 wherein said first GPS receiver, said second GPS receiver and said third GPS receiver each receive GPS position data from a plurality of GPS satellites, process said GPS position data and provide said GPS position data in an RS-232 Missile Application Condensed Measurements (MACM) Record format.

13. The tracking system of claim 3 wherein said microcontroller is programmed to operate as a universal asynchronous receiver/transmitter.

14. The tracking system of claim 3 wherein said decoder comprises an Non-Return to Zero Logic (NRZL) to RS-232 data converter.

15. A tracking system for providing position information to a ground station relating to movement of a missile and a target, said missile tracking said target on an interception course to intercept said target, said tracking system comprising:

a first Global Positioning System (GPS) receiving antenna having an output, said first GPS receiving antenna being mounted upon said missile;

a first filter having an input connected to the output of said first GPS receiving antenna and an output, said first filter being mounted within said missile;

a first amplifier having an input connected to the output of said first filter and an output, said first amplifier being mounted within said missile;

a first GPS receiver having an input connected to the output of said first amplifier, a first output and a second output, said first GPS receiver being mounted within said missile;

a first universal asynchronous receiver/transmitter having an input connected to the first output of said first GPS receiver and an output, said first universal asynchronous receiver/transmitter being mounted within said missile;

an encoder having a first input connected to the output of said first universal asynchronous receiver/transmitter, a second input connected to the second output of said first GPS receiver, a third input and an output, said encoder being mounted within said missile;

an inertial measurement unit having an output connected to the third input of said encoder, said inertial measurement unit being mounted within said missile;

a first transmitter having an input connected to the output of said encoder and an output, said first transmitter being mounted within said missile;

a first transmitting antenna having an input connected to the output of said first transmitter, said first transmitting antenna being mounted upon said missile;

a second GPS receiving antenna having an output, said second GPS receiving antenna being mounted within a radome of said target;

a second filter having an input connected to the output of said second GPS receiving antenna and an output, said second filter being mounted within said target;

a second amplifier having an input connected to the output of said second filter and an output, said second amplifier being mounted within said target;

a second GPS receiver having an input connected to the output of said second amplifier and an output, said second GPS receiver being mounted within said target;

a randomizer having an input connected to the output of said second GPS receiver and an output; said randomizer being mounted within said target;

a third filter having an input connected to the output of said randomizer and an output, said third filter being mounted within said target;

a second transmitter having an input connected to the output of said third filter and an output, said second transmitter being mounted within said target;

a second transmitting antenna having an input connected to the output of said second transmitter, said transmitting antenna being mounted within a radome of said target;

a first telemetry receiving antenna having an output, said first telemetry receiving antenna being located at said ground station;

a first telemetry receiver having an input connected to the output of said first telemetry receiving antenna and an output, said first telemetry receiver being located at said ground station;

a decommutator having an input connected to the output of said first telemetry receiver a first output and a second output, said decommutator being located at said ground station;

a second universal asynchronous receiver/transmitter having an input connected to the first output of said decommutator and an output, said second universal asynchronous receiver/transmitter being located at said ground station;

a first personal computer having a first input connected to the output of said second universal asynchronous receiver/transmitter, a second input and an output, said first personal computer being located at said ground station;

a third GPS receiving antenna having an output, said third GPS receiving antenna being located at said ground station;

a third GPS receiver having an input connected to the output of said GPS receiving antenna and an output connected to the second input of said first personal computer, said third GPS receiving antenna being located at said ground station;

a second telemetry receiving antenna having an output, said second telemetry receiving antenna being located at said ground station;

a second telemetry receiver having an input connected to the output of said second telemetry receiving antenna and an output, said second telemetry receiver being located at said ground station;

a bit sync circuit having an input connected to the output of said second telemetry receiver, a data output and a clock output, said bit sync circuit being located at said ground station;

a decoder having a data input connected to the data output of said bit sync circuit, a clock input connected to the clock output of said bit sync circuit and an output, said decoder being located at said ground station;

a second personal computer having a first input connected to the output of said decoder, a second input connected to the output of said third GPS receiver and an output;

a range display having a first input connected to the output of said first personal computer and a second input connected to the output of said second personal computer, said range being located at said ground station, said range display displaying a location for said target and said missile as said missile travels on said interception course to intercept said target; and a miss distance indicator computer having a first input connected to the output of said second universal asynchronous receiver/transmitter and a second input connected to the output of said decoder, said miss distance indicator computer includes computer software for calculating miss distance indicator data for said missile relative to said target as said missile tracks said target on said interception course to intercept said target.

16. The tracking system of claim 15 further comprising a strip chart having an input connected to the second output of said decommutator.

17. The tracking system of claim 15 further comprising a recorder having a first input connected to the output of said first telemetry receiver, a second input for receiving an Interrange Instrumentation Group timing signal and a third input for receiving a range radio signal.

18. The tracking system of claim 15 wherein said first personal computer includes a display for displaying Time, Space and Position Information for said missile.

19. The tracking system of claim 15 wherein said second personal computer includes a display for displaying Time, Space and Position Information for said target.

20. The tracking system of claim 15 wherein said first GPS receiver, said second GPS receiver and said third GPS receiver each receive GPS position data from a plurality of GPS satellites, process said GPS position data and provide said GPS position data in an RS-232 Missile Application Condensed Measurements (MACM) Record format.

* * * * *